UNITED STATES PATENT OFFICE.

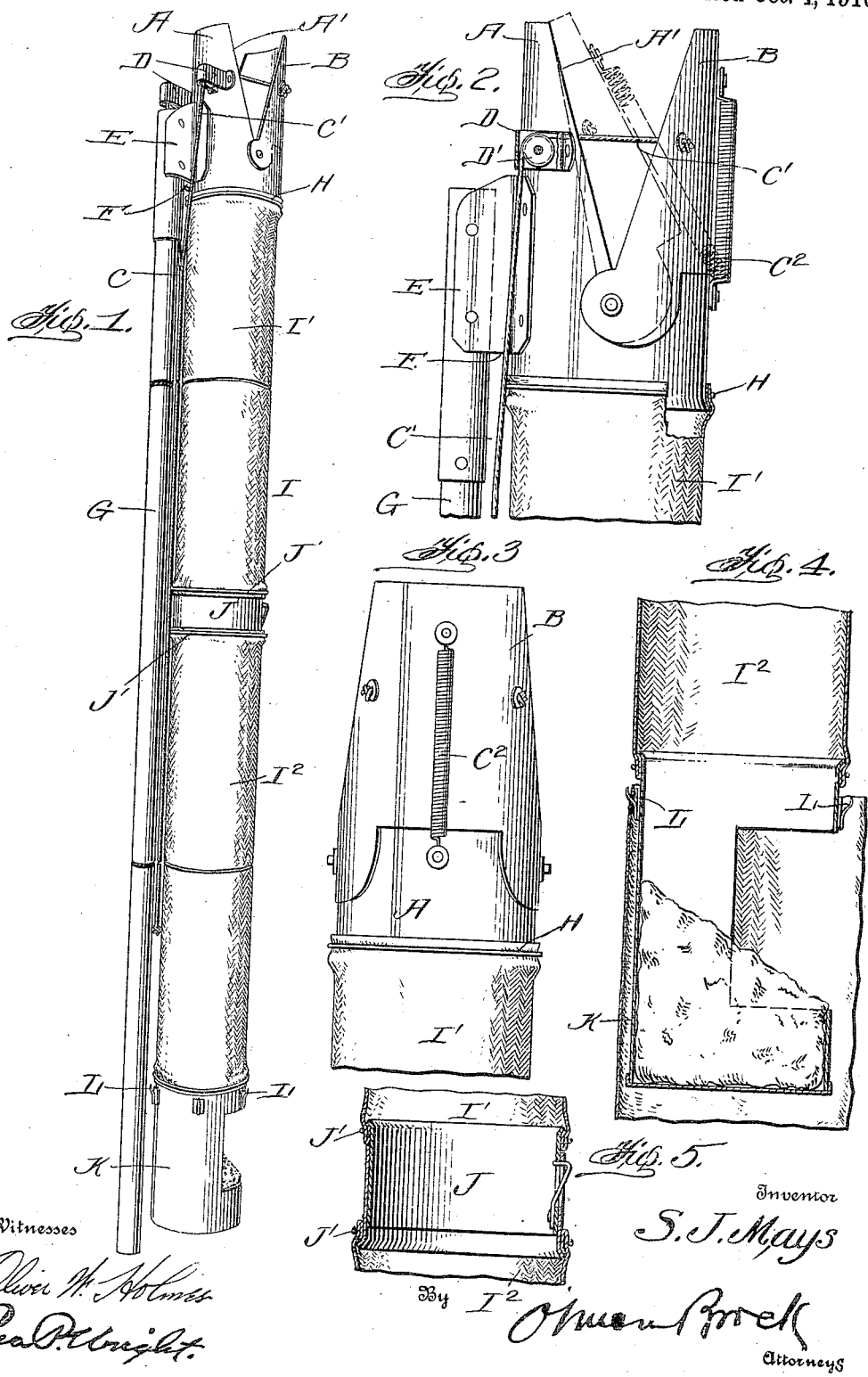

SHELBY J. MAYS, OF BELLEVIEW, TENNESSEE.

FRUIT-PICKER.

971,547.  Specification of Letters Patent.  Patented Oct. 4, 1910.

Application filed December 28, 1908. Serial No. 469,639.

*To all whom it may concern:*

Be it known that I, SHELBY J. MAYS, a citizen of the United States, residing at Belleview, in the county of Davidson and State of Tennessee, have invented a new and useful Improvement in Fruit-Pickers, of which the following is a specification.

This invention relates to fruit pickers and more particularly to devices especially adapted to pick fruit growing on trees, such as apples and pears, the object being to provide a device by means of which the pear or apple can be readily plucked from the tree and conveyed into a bag or basket.

A still further object of my invention is to provide a device comprising a pair of jaws, one of which is operated by a cord, so as to force the same into contact with the rigid jaw, whereby the stem of the fruit will be broken.

A further object of the invention is to provide the jaws with a canvas tube forming a chute in which the pear or apple will be conveyed to the bag or basket.

Another object of the invention is to provide the end of the tube with a delivery pocket having a cushion arranged therein, so as to break the fall of the apple or pear, whereby it will drop into the basket without bruising the fruit already deposited therein.

A still further object of the invention is to provide the delivery pocket with hooks for supporting a bag and it will be seen that when it is desired to attach a bag to the same, it is only necessary to force the hooks through the edge of the bag.

A still further object is to form the tube out of two sections connected together by a coupling member, whereby an additional section can be readily connected to the same when it is desired to increase the length of the tube.

With these objects in view my invention consists in the novel features of construction, combination and arrangement of parts, hereinafter fully described and pointed out in the claim.

In the drawings forming a part of this specification:—Figure 1 is a perspective view of my improved fruit picker. Fig. 2 is a detail view partly in section, and showing the jaw in dotted lines in a closed position. Fig. 3 is a detail side elevation showing the arrangement of the spring. Fig. 4 is a vertical section through the delivery pocket, and Fig. 5 is a section through the coupling member.

In carrying out my improved invention I employ a pipe-section A which is cut-away as shown to form a jaw A′ which co-acts with the pivoted jaw B mounted thereon, which is held in an opened position by a coiled spring $C^2$, one end of which is connected to the section A, and the other to the pivoted jaw B. For operating the pivoted jaw B I employ a cable C which is connected to a pair of cables C′ which pass over pulleys D′ mounted in brackets D secured to the fixed jaw A′. The cables then pass through openings formed in the jaw A′ and through openings formed in the pivoted jaw B, and have knots formed on their ends, for preventing the same from slipping through the openings. It of course is to be understood that the cables C′ can be connected to the pivoted jaw, in any suitable manner, but I have found this is the simplest way.

The section A is provided with spaced plates E carrying a socket F, in which is adapted to be secured the upper end of a pole G which is of any suitable length, but preferably about fifteen or twenty feet, so that the fruit on the ordinary tree can be reached, it of course being understood that the cable C is of a sufficient length that it can be readily grasped by the operator, so as to operate the jaw and sever the fruit from the tree, as will be hereinafter fully described.

Connected to the lower end of the section A by a clamping ring H is the upper end of a chute I which is formed of two canvas tubes I′ $I^2$ connected together by a coupling member J over which the ends of the respective tube-sections are clamped by rings J′ and it will be seen by this arrangement that an additional tube section can be inserted between the sections of the chute very readily, when it is desired to use a pole of a greater length. The coupling member J comprises a pair of telescoping tubes locked together by a spring catch $J^4$ carried by the inner tube which extends through an opening formed therein, into an opening formed in the outer tube.

The lower section of the chute is secured over the upper end of a delivery pocket K which comprises a cylindrical vessel having a cut-away portion, through which the fruit is adapted to pass, a piece of felt or sponge being arranged within the bottom of the vessel, so as to prevent the fruit from being bruised when dropping into the same, and it will be seen that by forming the felt or sponge with an inclined top leading out to the opened side of the vessel, the fruit striking the same will be thrown outwardly. Extending outwardly from the vessel above the opening are hooks L over which are adapted to be forced the edge of a bag, so that as the fruit is delivered into the delivery pocket from the chute, it will be thrown out of the pocket into the bag in such a manner that the fruit will not become bruised or injured in any way. It is of course understood that a basket can be supported from the hook if desired.

The operation of the device is as follows: The user grasps the pole and guides the jaws over the pear or apple and by drawing downwardly on the cable, the fruit will be loosened from the tree and dropped by gravity through the chute into the delivery pocket, and from there into the bag or basket, it of course being understood that the bag or basket is to be provided with some suitable supporting means which can be thrown over the shoulder of the user, so as to allow the operator to have free use of both hands, and it will be seen that by this arrangement a quantity of apples or pears can be gathered without stopping to deposit the same into barrels or the like.

Having thus fully described my invention, what I claim as new and desire to secure by Letters Patent is:—

As a new article of manufacture, a fruit picker comprising a supporting pole having a picking member mounted on its upper end, a sectional chute connected to said picking member, said sections being connected together by a coupling member comprising telescoping tubes locked together by a spring catch, a delivery pocket secured to the lower end of said chute having outwardly projecting bag supporting members, said picking member comprising a pipe section cut away at one end to form a rigid curved jaw, a curved jaw mounted on said pipe section coacting with said jaw, a coiled spring having one of its ends connected to the pivoted jaw and the pivoted jaw in alinement with said pipe other to the pipe section for holding said pivoted jaw in alinement with said pipe sections, spaced pulley brackets secured on the outer face of the rigid jaw, cables connected to the pivoted jaw passing through the rigid jaw over said pulley and an operating cable connected to said cables.

SHELBY J. MAYS.

Witnesses:
 JOHN GARLAND,
 JAMES GARLAND.